(12) United States Patent
Shintani et al.

(10) Patent No.: US 8,654,216 B2
(45) Date of Patent: Feb. 18, 2014

(54) CAMERA SYSTEM, CAMERA BODY, AND LENS UNIT

(75) Inventors: Dai Shintani, Osaka (JP); Akira Koga, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/420,611

(22) Filed: Mar. 15, 2012

(65) Prior Publication Data

US 2012/0236182 A1  Sep. 20, 2012

(30) Foreign Application Priority Data

Mar. 16, 2011 (JP) ................... 2011-057504
Feb. 14, 2012 (JP) ................... 2012-029575

(51) Int. Cl.
*H04N 5/262* (2006.01)
(52) U.S. Cl.
USPC ...................................... 348/240.3; 348/345
(58) Field of Classification Search
USPC ........... 348/240.99, 240.1, 240.2, 240.3, 375, 348/345–347
See application file for complete search history.

(56) References Cited

U.S. PATENT DOCUMENTS

| 6,130,994 | A | * | 10/2000 | Maruyama | 396/60 |
| 2008/0267601 | A1 | * | 10/2008 | Kobayashi | 396/91 |
| 2010/0013986 | A1 | * | 1/2010 | Yamamoto | 348/375 |
| 2010/0238321 | A1 | | 9/2010 | Honjo et al. | |
| 2012/0099004 | A1 | * | 4/2012 | Shibuno | 348/240.3 |

FOREIGN PATENT DOCUMENTS

JP   5-288977 A   11/1993
WO  WO-2009/041063 A   4/2009

* cited by examiner

*Primary Examiner* — Tuan Ho
(74) *Attorney, Agent, or Firm* — Shinjyu Global IP (57) ABSTRACT

A camera system includes a lens unit, a mount, a camera body, and a control unit. The lens unit includes at least one lens unit operation portion and changes the magnification of an optical image electrically. The mount supports removably the lens unit. The camera body includes at least one camera body operation portion. The control unit controls the lens unit so as to change the magnification of an optical image electrically in response to either one of the operation of the camera body operation portion or the operation of the lens unit operation portion. The control unit controls the lens unit so as to execute an operation that is different from the operation which changes the magnification of an optical image, in response to the other of the operation of the camera body operation portion or the operation of the lens unit operation portion.

9 Claims, 4 Drawing Sheets

CAMERA SYSTEM, CAMERA BODY, AND LENS UNIT

CROSS-REFERENCE TO RELATED APPLICATIONS

This application claims priority to Japanese Patent Application No. 2011-057504, filed on Mar. 16, 2011 and No. 2012-029575, filed on Feb. 14, 2012. The entire disclosure of Japanese Patent Application No. 2011-057504 and No. 2012-029575 are hereby incorporated herein by reference.

BACKGROUND

1. Technical Field

The technology disclosed herein relates to an interchangeable lens type of camera system, camera body, and lens unit with which lenses can be interchanged.

2. Background Information

Recent years have witnessed the growing popularity of digital cameras in which a CCD (charge-coupled device) image sensor, a CMOS (complementary metal oxide semiconductor) image sensor, or another such imaging element is used to convert a subject image into an electrical image, and this electrical signal is digitized and recorded (see International Laid-Open Patent Application 2009/041063).

With interchangeable lens cameras, such as digital single-lens reflex cameras or digital range finder cameras, there has been a need to achieve high-speed and highly accurate focusing and to correct lens aberration on the camera side, in order to accommodate the reduction in the size of pixels resulting from an increase in the number of pixels of an imaging element and viewing in the situations in which images are highly enlarged on a computer screen, and so forth. Also, high-resolution moving picture capture is also possible, and high-precision lens control has become essential.

However, the zooming interchangeable lenses made up to now whose purpose was the capture of still pictures involved rotary optical zooming by hand, or rectilinear optical zooming by hand, so a problem was that it was difficult to perform smooth zooming or zooming at a constant rate during moving picture capture. Therefore, there has been a need for electrical optical zooming with a zooming interchangeable lens.

SUMMARY

With the camera in Patent Literature 1, when an interchangeable lens unit is compatible with electrical manual focusing, if the electrical manual focusing is executed by operating a cross key on the camera body, a problem is that none of the existing imaging functions other than electrical manual focusing that are assigned to the cross key on the camera body can be used.

The present technology was conceived in light of this point, and it is an object thereof to provide an interchangeable lens type of imaging apparatus with which electrical zooming or electrical focusing can be performed from the camera body side, without sacrificing the functions of the camera body, when an interchangeable lens, which is capable of executing electrical zooming or electrical focusing, has been mounted to the camera body.

This camera system disclosed herein comprises a lens unit, a mount, a camera body, and a control unit. The lens unit includes at least one lens unit operation portion and is configured to change the magnification of an optical image electrically. The mount is configured to support removably the lens unit. The camera body includes at least one camera body operation portion. The control unit is configured to control the lens unit mounted to the mount so as to change the magnification of an optical image electrically in response to either one of the operation of the camera body operation portion or the operation of the lens unit operation portion. The control unit is configured to control the lens unit mounted to the mount so as to execute an operation that is different from the operation which changes the magnification of an optical image, in response to the other of the operation of the camera body operation portion or the operation of the lens unit operation portion.

This camera body is used in a camera system that captures an image of a subject. This camera body comprises an imaging unit, a mount, a control unit, and a zoom operation portion. The imaging unit is configured to image a subject. The mount is configured to support removably the lens unit. The control unit is configured to control the lens unit mounted to the mount. The zoom operation portion is configured to change the magnification of an optical image of the lens unit electrically.

This lens unit is used in a camera system for capturing images of a subject. This lens unit is removably mounted to a camera body. The camera body includes an imaging unit for imaging the subject and a main body control unit for controlling the imaging operation of the imaging unit. The lens unit comprises a plurality of lens unit operation portions. The plurality of lens unit operation portions changing electrically the magnification of an optical image.

With the present technology, electrical zooming can be performed with an operation portion on the camera body side when an interchangeable lens capable of changing its magnification by electrical zooming has been mounted to the camera body. Also, since manual focusing can be performed with an operation portion on the interchangeable lens side, the proper imaging can be carried out. Furthermore, if the camera body has no operation portion and an interchangeable lens has been mounted to the camera body, electrical zooming can be performed with the operation portion on the interchangeable lens side.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the technology as defined by the appended claims and their equivalents.

Embodiment

The camera system and camera body pertaining to embodiments of the present technology will now be described. The following embodiments are just examples of the present technology, and the present technology is not limited to or by these embodiments.

1: Configuration

1-1: Overview of Camera System

Figure 1:
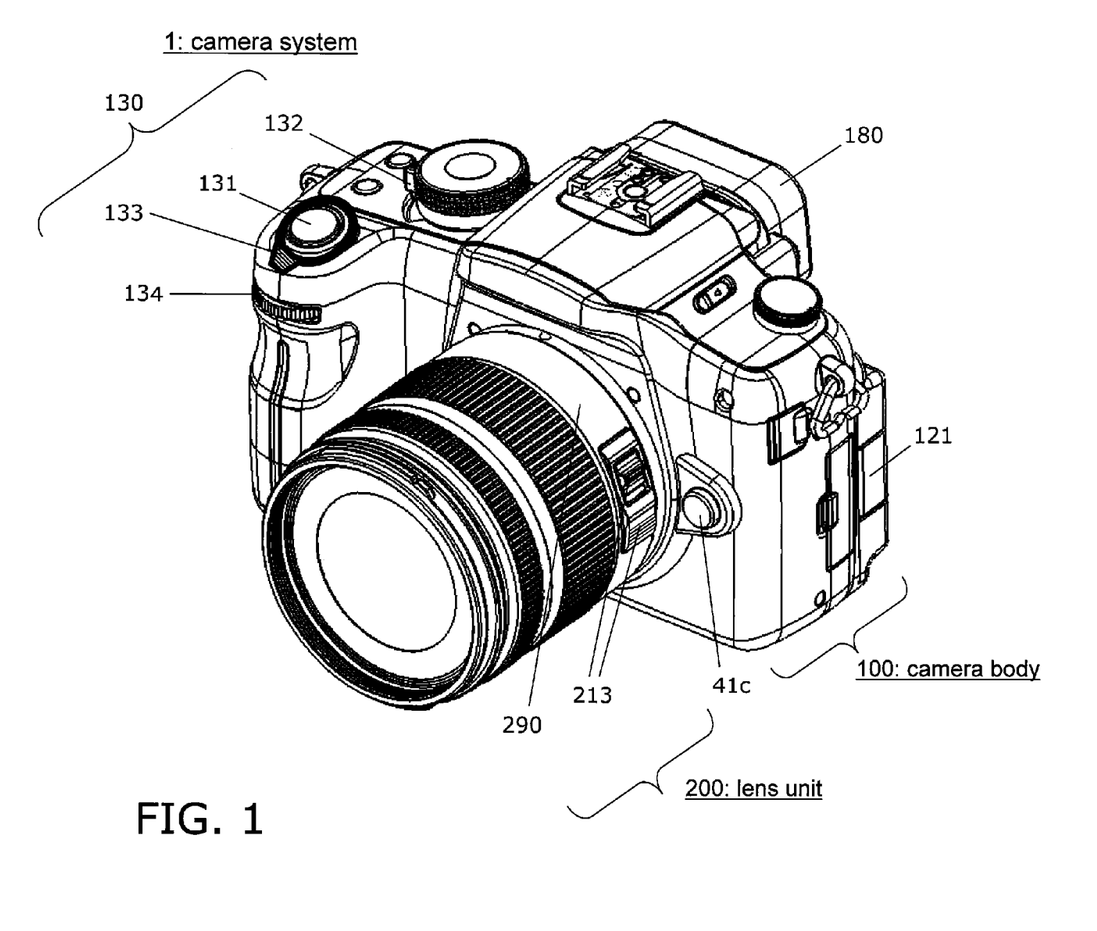
FIG. 1 is an oblique view of a camera system 1.
Figure 2:
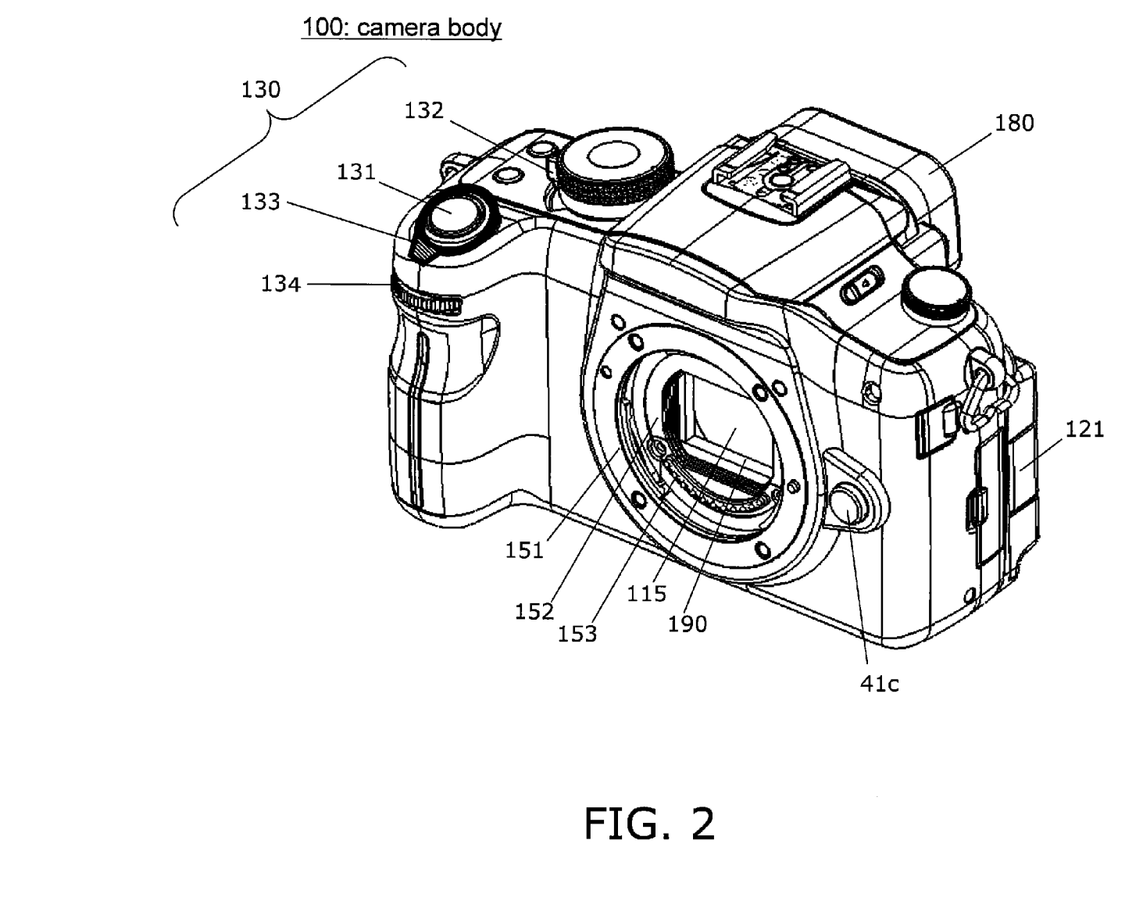
FIG. 2 is an oblique view of a camera body 100.
Figure 3:
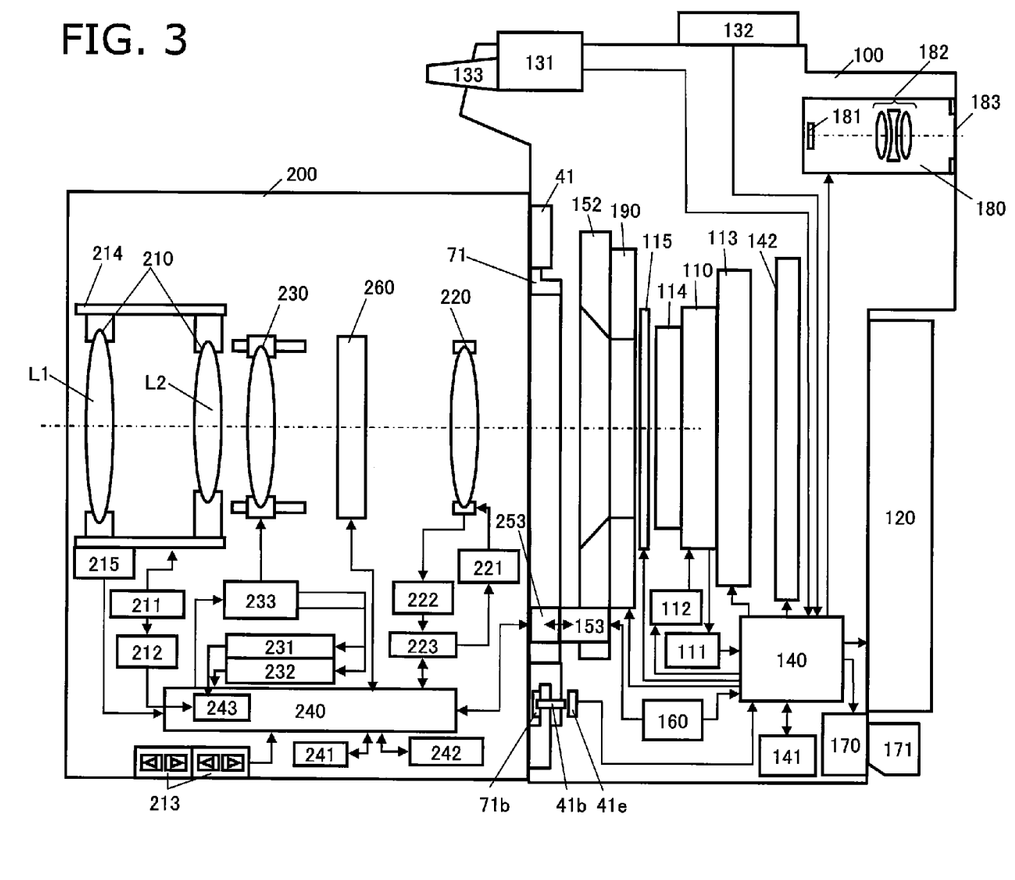
FIG. 3 is a block diagram of the camera system 1.
Figure 4:
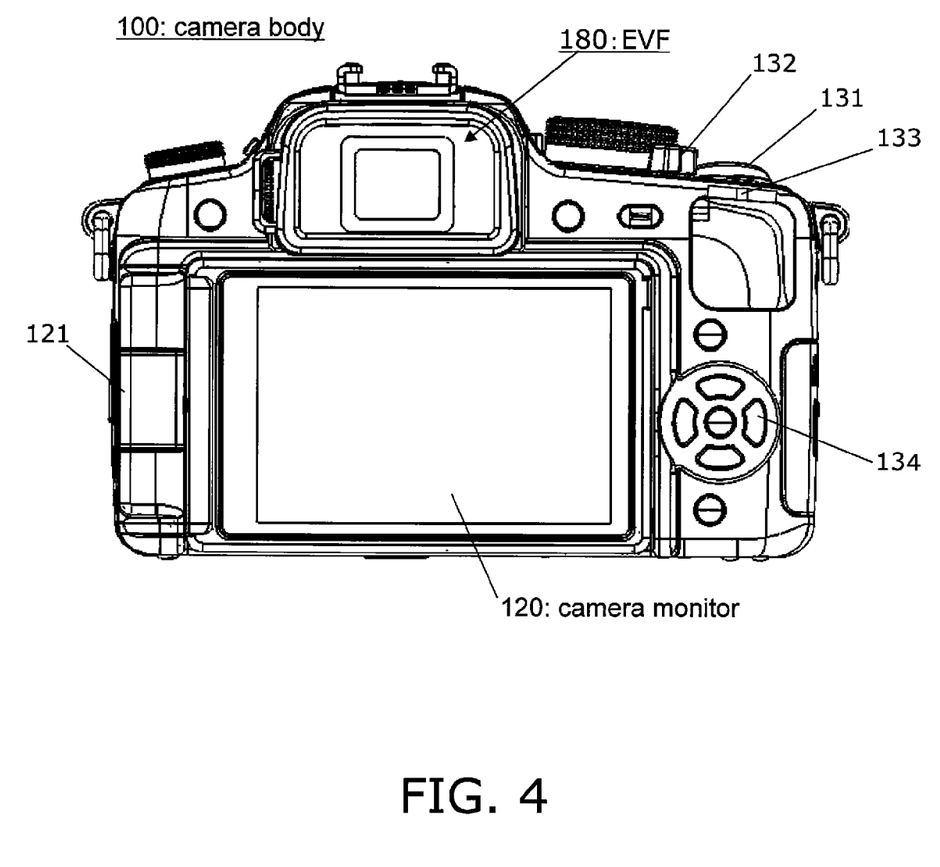
FIG. 4 is a rear view of the camera body 100.

FIG. 1 is an oblique view of the camera system 1 pertaining to a first embodiment of the present technology. The camera system 1 is made up of a camera body 100 and a lens unit 200 that can be attached to and removed from the camera body 100. FIG. 2 is an oblique view of the camera body 100. FIG. 3 is a functional block diagram of the camera system 1. And FIG. 4 is a rear view of the camera body 100.

The various components will now be described in detail. For the sake of this description, the subject side of the camera system 1 will sometimes be referred to as the front, the imaging face side as the back or rear, the vertical upper side when the camera system 1 is in its normal orientation as the top, and the vertical lower side as the bottom.

1-2: Configuration of Camera Body

The camera body 100 mainly comprises a CMOS image sensor 110, a CMOS circuit board 113, a camera monitor 120, a first operation portion 130, a main control board 142 that includes a camera controller 140, a body mount 41, a power supply 160, a card slot 170, an electronic viewfinder 180, a shutter unit 190, an optical filter 114, and a diaphragm 115. The camera body 100 has no mirror box apparatus.

Also, the body mount 41, the shutter unit 190, the diaphragm 115, the optical filter 114, the CMOS image sensor 110, the CMOS circuit board 113, the main control board 142, and the camera monitor 120 are disposed in that order, starting from the front, in the camera body 100. For example, an imaging unit is made up of the optical filter 114, the CMOS image sensor 110, and the CMOS circuit board 113.

The CMOS image sensor 110 produces image data by capturing an optical image of a subject that is incident through the lens unit 200. The CMOS image sensor 110 has an opto-electrical conversion layer and a color filter layer. A plurality of pixels in which a charge can be stored through opto-electrical conversion are disposed in the opto-electrical conversion layer. A blue color filter that transmits only blue light, a green color filter that transmits only green light, and a red color filter that transmits only red light are disposed in a one-on-one correspondence with the pixels on the front face of each pixel of the opto-electrical conversion layer. The CMOS image sensor 110 amplifies signals from pixels where blue color filters are disposed, signals from pixels where green color filters are disposed, and signals from pixels where red color filters are disposed. The CMOS image sensor 110 produces image data on the basis of these signals.

The image data that is produced is digitized by an A/D converter 111. The image data digitized by the A/D converter 111 is subjected to various image processing by the camera controller 140. The various image processing referred to here includes, for example, gamma correction processing, white balance correction processing, scratch correction processing, white balance correction processing, scratch correction processing, YC conversion processing, electronic zoom processing, and JPEG compression processing.

The CMOS image sensor 110 operates at a timing controlled by a timing generator 112. The CMOS image sensor 110 performs the capture of still pictures, the capture of moving pictures, and so forth. The capture of moving pictures includes the capture of a through-image. A "through-image" here is an image that is not recorded to a memory card 171 after the capture of a moving picture. Through-images are primarily moving pictures, and are displayed on the camera monitor 120 and/or the electronic viewfinder 180 (hereinafter also referred to as EVF) to determine the composition of a moving or still picture. The capture of moving pictures also includes the recording of moving pictures. The "recording of moving pictures" is an operation that includes the capture of moving pictures and the recording of moving picture data to the memory card 171.

The CMOS image sensor 110 is an example of an imaging element captures an optical image of a subject and converts it into an electrical image signal. The imaging element is a concept that encompasses the CMOS image sensor 110 and the like.

The CMOS circuit board 113 is a circuit board that controls the drive of the CMOS image sensor 110. The CMOS circuit board 113 is also a circuit board that subjects image data from the CMOS image sensor 110 to specific processing. The CMOS circuit board 113 includes the timing generator 112. The CMOS circuit board 113 also includes the A/D converter 111. The CMOS circuit board 113 is an example of an imaging element circuit board that controls the drive of the imaging element, and/or an imaging element circuit board that subjects the image data from the imaging element to A/D conversion and other such specific processing.

The camera monitor 120 displays an image indicated by display-use image data, etc. The display-use image data is produced by the camera controller 140. The display-use image data is image data that has undergone image processing, data for displaying the photography conditions of the camera system 1, a control menu, or the like as an image, or the like. The camera monitor 120 is capable of selectively displaying both moving and still pictures. The camera monitor 120 has a liquid crystal display.

The camera monitor 120 is provided to the camera body 100. In this embodiment, the camera monitor 120 is disposed on the rear face of the camera body 100, but may be disposed anywhere on the camera body. The camera monitor 120 is such that the angle of the display screen can be varied with respect to the camera body 100. More specifically, the camera body 100 has a hinge 121 between the camera body 100 and the camera monitor 120. The hinge 121 is disposed at the left end of the camera body 100. More specifically, the hinge 121 comprises a first hinge and a second hinge. More specifically, the camera monitor 120 is able to rotate to the left and right around the first hinge, and is able to rotate up and down around the second hinge.

The camera monitor 120 is an example of a display unit provided to the camera body 100. Other examples of a display unit include an organic electroluminescence unit, an inorganic electroluminescence unit, a plasma display panel, and other such devices that allow images to be displayed. The display unit need not be disposed on the rear face of the camera body 100, and may instead be provided to a side face, the top face, or another such place.

The electronic viewfinder (hereinafter also referred to as "EVF") 180 displays an image corresponding to the display-use image data produced by the camera controller 140, etc. The EVF 180 is capable of selectively displaying both moving and still pictures. The EVF 180 and the camera monitor 120 may display the same or different content, and both are controlled by the camera controller 140. The EVF 180 has an EVF-use liquid crystal monitor 181 that displays images and the like, an EVF-use optical system 182 that enlarges the display of the EVF-use liquid crystal monitor, and an eyepiece 183 up to which the user puts an eye.

The EVF 180 is also an example of a display unit. The EVF 180 differs from the camera monitor 120 in that the user puts an eye up to it. The difference in terms of structure is that whereas the EVF 180 has the eyepiece 183, the camera monitor 120 does not have an eyepiece 183.

With the EVF-use liquid crystal monitor 181, a back light (not shown) is provided in the case of a transmission type of liquid crystal, and a front light (not shown) is provided in the case of a reflection type of liquid crystal. This ensures the proper display brightness for the EVF-use liquid crystal monitor 181. The EVF-use liquid crystal monitor 181 is an example of an EVF-use monitor. The EVF-use monitor can be an organic electroluminescence unit, and inorganic electroluminescence unit, a plasma display panel, or the like. There is no need for an illumination light source in the case of an organic electroluminescence unit or other such self-emitting device.

The first operation portion 130 accepts operation by the user. The first operation portion 130 is operated by the user. The first operation portion 130 includes a release button 131. The release button 131 is used for shutter operation by the user. The first operation portion 130 includes a power switch 132. The power switch 132 is a rotary dial switch provided to the top face of the camera body 100. The power switch 132 is such that the power is off in a first rotation position, and the power is on in a second rotation position.

The first operation portion 130 includes an operation member 133 (an example of a camera body operation portion). For example, as shown in FIGS. 1 and 2, when the camera body 100 is viewed from the camera monitor 120 side, the operation member 133 is disposed on the right side of the top face of the camera body 100. In other words, when the camera body 100 is viewed from the subject side, the operation member 133 is disposed on the left side of the top face of the camera body 100. As shown in FIG. 4, when the camera body 100 is viewed from the camera monitor 120 side, the operation member 133 may be disposed on the right side of the rear face of the camera body 100.

Also, the operation member 133 is a rotary lever switch provided around the release button 131 on the top face of the camera body 100. When not being used, the first operation portion 130 is biased so as to maintain a neutral position. When turned by the user, the first operation portion 130 is rotated to the left and right, approximately around the release button. The first operation portion 130 encompasses a button, lever, dial, touch panel, or the like, so long as it can be operated by the user.

The camera controller 140 controls the entire camera body 100, including the CMOS image sensor 110 and other such components. The camera controller 140 controls the shutter unit 190 so as to keep the shutter unit 190 open in a state in which the supply of power from the power supply 160 has been halted. The camera controller 140 also receives instructions from the first operation portion 130. The camera controller 140 transmits signals for controlling the lens unit 200 through the body mount 41 and a lens mount 71 to a lens controller 240. The camera controller 140 also indirectly controls the various components of the lens unit 200. Specifically, the camera controller 140 controls the entire camera system 1.

The camera controller 140 also receives various kinds of signals from the lens controller 240 via the body mount body mount 41 and the lens mount 71. The camera controller 140 uses a DRAM 141 as a working memory during control operations and image processing operations. The camera controller 140 is an example of a body controller. The camera controller 140 is disposed on the main control board 142.

The card slot 170 allows the memory card 171 to be inserted. The card slot 170 controls the memory card 171 on the basis of control from the camera controller 140. More specifically, the card slot 170 stores image data on the memory card 171. The card slot 170 outputs image data from the memory card 171. It also stores moving picture data on the memory card 171. The card slot 170 outputs moving picture data from the memory card 171.

The memory card 171 is able to store the image data produced by the camera controller 140 in image processing. For instance, the memory card 171 can store uncompressed raw image files, compressed JPEG image files, or the like. Also, the memory card 171 can output internally stored image data or image files. The image data or image files outputted from the memory card 171 are subjected to image processing by the camera controller 140. For example, the camera controller 140 produces display-use image data by subjecting the image data or image files acquired from the memory card 171 to expansion, etc.

The memory card 171 is further able to store moving picture data produced by the camera controller 140 in image processing. For instance, the memory card 171 can store moving picture files compressed according to H.264/AVC, which is a video compression standard. The memory card 171 can also output internally stored moving picture data or moving picture files. The moving picture data or moving picture files outputted from the memory card 171 are subjected to image processing by the camera controller 140. For example, the camera controller 140 produces display-use video data by expanding the moving picture data or moving picture files acquired from the memory card 171.

The memory card 171 is also an example of a memory unit. The memory unit may be one that can be mounted to the camera body 100, such as the memory card 171, or may be one that is fixed to the camera system 1.

The power supply 160 supplies electrical power for use by the camera system 1. The power supply 160 may, for example, be a dry cell, or may be a rechargeable cell. The power supply 160 may also supply the camera system 1 with power from the outside, such as via a power cord.

The body mount body mount 41 supports the removable lens unit 200. The body mount 41 can be mechanically and electrically connected with the lens mount 71 of the lens unit 200. Data and/or control signals can be sent and received between the camera body 100 and the lens unit 200 via the body mount 41 and the lens mount 71. More specifically, the body mount 41 and the lens mount 71 can send and receive data and/or control signals between the camera controller 140 and the lens controller 240. The body mount 41 supplies power received from the power supply 160 to the entire lens unit 200 via the lens mount 71.

More specifically, the body mount 41 includes a body mount contact support component 152. The body mount 41 is either in a state of being mated with the lens mount 71 or a state of not being mated with the lens mount 71, depending on the rotational position relation around the optical axis of the lens mount 71 of the lens unit 200. Specifically, when the rotational position relation of the body mount 41 and the lens mount 71 is in a first state, the lens mount 71 is not mated with the body mount 41, and the lens mount 71 is able to move in the optical axis direction with respect to the body mount 41.

When the body mount 41 is inserted into the lens mount 71 in the first state, and the lens mount 71 is rotated with respect to the body mount 41, the lens mount 71 mates with the body mount 41. The rotational position relation between the body mount 41 and the lens mount 71 here is a second state. When the rotational position relation is in this second state, the body mount 41 mechanically supports the lens unit 200. The body mount 41 therefore needs to be strong, and the body mount 41 is preferably formed from metal.

The body mount contact support component 152 has a plurality of electrical contacts 153. The electrical contacts 153 are electrically connected to electrical contacts 253 of the lens mount 71. The electrical contacts 153 of the body mount 41 and the electrical contacts 253 of the lens mount 71 allow the body mount 41 and the lens mount 71 to be electrically connected. Also, the electrical contacts 153 of the body mount 41 and the electrical contacts 253 of the lens mount 71 allow power, data, and/or control signals to be sent and received. The body mount contact support component 152 is disposed between the body mount 41 and the shutter unit 190. The body mount contact support component 152 has an opening.

The shutter unit 190 is a focal plane shutter, for example. The shutter unit 190 is disposed between the body mount 41 and the CMOS image sensor 110. The shutter unit 190 can maintain an open state mechanically. The shutter unit 190 is controlled by the camera controller 140 so that its open state is mechanically maintained in a state in which the power to the camera body 100 has been shut off. The term "mechanically maintained" here is a concept meaning that an open state is maintained without the use of electrical power. For example, this can involve two objects being engaged, or maintaining an open state with a permanent magnet.

The optical filter 114 has the function of an optical low-pass filter that eliminates the high-frequency component of the subject light. More specifically, the optical filter 114 separates a subject image formed by the lens unit 200 so that the resolution is coarser than the pitch of the pixels of the CMOS image sensor 110. In general, the CMOS image sensor 110 or other imaging element has an RGB color filter called a Bayer pattern, or a YCM complementary color filter, provided for each pixel. Therefore, if the resolution goes to one pixel, not only will a false color be generated, but if the subject is a repeating pattern, an unattractive moire will result. Furthermore, the optical filter 114 has an infrared cut filter function for cutting out infrared light with a wavelength of approximately 650 nm or higher.

The diaphragm 115 is disposed in front of the CMOS image sensor 110, and prevents dust from clinging to the CMOS image sensor 110. Also, any dust clinging to the diaphragm 115 itself is knocked off by the vibration of the diaphragm 115. More specifically, with the diaphragm 115, a thin, transparent sheet-like member is fixed to another member via a piezoelectric element. AC voltage is applied to the piezoelectric element, which causes the piezoelectric element to vibrate, and this vibrates the sheet-like member.

1-3: Configuration of Lens Unit

The lens unit 200 comprises an optical system, the lens controller 240, the lens mount 71, an aperture unit 260, a lens barrel 290, and a second operation portion 213 (an example of a lens unit operation portion). The optical system of the lens unit 200 includes a zoom lens 210, an OIS lens 220, and a focus lens 230. The optical system is housed in the interior of the lens barrel 290.

The zoom lens 210 is used to change the magnification of an optical image of a subject (hereinafter also referred to as a subject image) formed by the optical system of the lens unit 200, or in other words, to change the focal distance of the optical system. The zoom lens 210 is made up of one or more lenses. The zoom lens 210 includes a first lens group L1 and second lens group L2 of the optical system. The zoom lens 210 changes the focal distance by moving in a direction parallel to the optical axis AX. A zoom drive ring 214 is provided around the outside of the zoom lens 210. A cam groove is formed in the inner face of the zoom drive ring 214. The cam groove engages with cam followers (not shown) provided to the first lens group L1 and the second lens group L2. Consequently, the above-mentioned focal distance changes when the zoom drive ring 214 is rotationally driven.

The zoom drive ring 214 is an example of a zoom driver that drives the focal distance, and determines the focal distance according to the position after drive.

A zoom motor 211 is lined to the zoom drive ring 214. The rotational force of the zoom motor 211 is transmitted to the zoom lens 210, causing the zoom lens 210 to move in the optical axis AX direction of the optical system. The zoom drive ring 214 has a cam mechanism, for example. The rotation of the zoom drive ring 214 is converted by this cam mechanism into rectilinear motion of the zoom lens 210. The zoom motor 211 and the zoom drive ring 214 are an example of a zoom lens drive means. The zoom motor 211 encompasses a DC motor, a stepping motor, an ultrasonic motor, and all other such devices that generate rotational drive force.

A relative position detector 212 and a home position detector 215 are encoders that produce signals indicating the drive state of the zoom lens 210. The relative position detector 212 consists of a rotary slit plate and a photointerrupter for detecting the amount of rotation of the zoom motor 211.

The home position detector 215 is a home point detector that detects the home position of the zoom drive ring 214. The home position detector 215 is a photosensor, for example. The lens controller 240 recognizes that the zoom drive ring 214 is at the home point from a signal from the home position detector 215. At this point the lens controller 240 sets the value of a counter 243 that is provided internally. This counter 243 counts the extreme values of the photointerrupter signal outputted from the relative position detector 212. If an extreme value of a photointerrupter signal is detected when the zoom lens 210 has moved in a first direction parallel to the optical axis AX, the count is set to "+1." If an extreme value of a photointerrupter signal is detected when the zoom lens 210 has moved in a second direction that is the opposite of the first direction parallel to the optical axis AX, the count is set to "−1."

Thus, the lens controller 240 detects a relative position from the home position, which is an absolute position. Consequently, the lens controller 240 is able to ascertain the position of the zoom lens 210 in the optical axis AX direction by using the amount of rotation of the zoom drive ring 214 from its home position.

The relative position detector 212 and the home position detector 215 are examples of a zoom lens position detection means. A zoom lens position detection means may be one that detects the position of the zoom lens directly, or one that detects the position of a mechanical member that is linked to the zoom lens.

For example, the zoom motor 211 transmits rotational force to the zoom lens 210 by means of a screw and nut mechanism or the like, and thereby moves the first lens group L1 to a position in the optical axis AX direction. Furthermore, a zoom motor may be provided for use by the second lens group L2, and the second lens group L2 similarly moved to a position in the optical axis AX direction by means of a screw and nut mechanism or the like.

The OIS lens 220 is used to correct blurring of a subject image formed by the optical system of the lens unit 200. More specifically, the OIS lens 220 corrects blurring of the subject image caused by shake of the camera system 1. The OIS lens 220 moves in the direction of canceling out shake of the camera system 1. Consequently, the OIS lens 220 reduces relative shake between the CMOS image sensor 110 and the subject image. More specifically, the OIS lens 220 moves in the direction of canceling out shake of the camera system 1, and thereby reduces blurring of the subject image on the CMOS image sensor 110. The OIS lens 220 is made up of one or more lenses. An actuator 221 is controlled by an OIS-use IC 223 and drives the OIS lens 220 within a plane that is perpendicular to the optical axis AX of the optical system.

The actuator 221 can be made up of a magnet and a flat coil, for example. A position detecting sensor 222 detects the position of the OIS lens 220 within a plane that is perpendicular to the optical axis AX of the optical system. The position detecting sensor 222 can be made up of a magnet and a Hall element, for example. The OIS-use IC 223 controls the actuator 221 on the basis of the detection result of the position detecting sensor 222 and the detection result of a gyro sensor or other such shake detector. The OIS-use IC 223 obtains the detection result of the shake detector from the lens controller 240. The OIS-use IC 223 also sends a signal to the lens controller 240 indicating the status of optical image blur correction processing.

The OIS lens 220 is an example of a blur corrector. Electronic blur correction that corrects image data on the basis of image data from a CCD may be used as a means for correcting blurring of the subject image caused by shaking of the camera system 1. Also, a configuration in which the CMOS image sensor 110 is driven within a vertical plane that is parallel to the optical axis AX of the optical system may be used as a means for reducing the relative blurring between the subject image and the CMOS image sensor 110 caused by shaking of the camera system 1.

The focus lens 230 is used to change the focal state of the subject image formed by the optical system on the CMOS image sensor 110. The focus lens 230 is made up of one or more lenses. The zoom lens 210 changes the focal state of the subject image by moving in a direction that is parallel to the optical axis AX of the optical system.

A focus motor 233 drives the focus lens 230 so that it moves forward and backward along the optical axis AX of the optical system under the control of the lens controller 240. Consequently, the focus motor 233 can change the focal state of the subject image formed by the optical system on the CMOS image sensor 110. The focus motor 233 can drive the focus lens 230 independently of the drive of the zoom lens 210. More specifically, the focus motor 233 drives the focus lens 230 in the optical axis AX direction using the second lens group L2 as a reference. In other words, the focus motor 233 is able to modify the relative distance between the second lens group L2 and the focus lens 230 in the optical axis AX direction. The focus lens 230 and the focus motor 233 move in the optical axis AX direction along with the second lens group L2. Therefore, when the second lens group L2 moves in the optical axis AX direction due to zooming, the focus lens 230 and the focus motor 233 also move in the optical axis AX direction. Also, even in a state in which the second lens group L2 is stationary in the optical axis AX direction, the focus motor 233 can drive the focus lens 230 in the optical axis AX direction using the second lens group L2 as a reference. The focus motor 233 can be a DC motor, a stepping motor, a servo motor, an ultrasonic motor, or the like. The focus motor 233 is an example of a focus lens drive means.

A relative position detector 231 and a home position detector 232 are encoders that produce signals indicating the drive state of the focus lens 230. The relative position detector 231 has a magnetic scale and a magnetic sensor, detects a change in magnetism, and outputs a signal corresponding to the change in magnetism. An example of a magnetic sensor is an MR sensor.

The home position detector 232 is a home point detector that detects the home position of the focus lens 230 with respect to the second lens group L2. The home position detector 232 is a photosensor, for example. The lens controller 240 recognizes that the focus lens 230 is at its home point from a signal from the home position detector 232. At this point the lens controller 240 sets the value of a counter 243 that is provided internally. This counter 243 counts the extreme values of magnetic changes by using signals outputted from the relative position detector 231. If an extreme value for magnetic change is detected when the focus lens 230 moves in a first direction that is parallel to the optical axis AX, the count is set to "+1." If an extreme value for magnetic change is detected when the focus lens 230 moves in a second direction that is parallel to the optical axis AX, the count is set to "−1." Thus, the lens controller 240 detects a relative position from the home position, which is an absolute position, and thereby ascertains the position of the focus lens 230 in the optical axis AX direction with respect to the second lens group L2.

As discussed above, the lens controller 240 is able to ascertain the position of the second lens group L2 in the optical axis AX direction within the lens unit 200. Therefore, the lens controller 240 is able to ascertain the position of the focus lens 230 in the optical axis AX direction within the lens unit 200.

The relative position detector 231 and the home position detector 232 are examples of a focus lens position detection means. A focus lens position detection means may be one that detects the position of the focus lens directly, or one that detects the position of a mechanical member that is linked to the focus lens.

The aperture unit 260 is a light quantity adjusting member that adjusts the quantity of light transmitted by the optical system. The aperture unit 260 has aperture vanes that can block part of the light rays transmitted by the optical system, and an aperture driver that adjusts the quantity of light by driving the aperture vanes and varying the amount of blockage thereof. The camera controller 140 directs the operation of the aperture unit 260 on the basis of the quantity of light received by the CMOS image sensor 110, the imaging state (still picture imaging or moving picture imaging), the aperture value setting state (such as preferential setting of the aperture value), and so forth.

The lens controller 240 controls the entire lens unit 200, such as the OIS-use IC 223 and the focus motor 233, on the basis of control signals from the camera controller 140. The lens controller 240 also receives signals from the detector 212, the OIS-use IC 223, the relative position detector 231, home position detector 232, and so forth, and sends these to the camera controller 140. The lens controller 240 exchanges signals with the camera controller 140 via the lens mount 71 and the body mount 41. The lens controller 240 uses a DRAM 241 as a working memory during control. Also, a flash memory 242 stores programs and parameters used in control by the lens controller 240.

More specifically, various information related to the lens unit 200 (lens information) is stored in the flash memory 242. This lens information includes, for example, information related to the model used for identifying the lens unit 200 (lens identification information). This lens identification information includes the manufacturer of the lens unit 200, the manufacture date, the model number, an ID, the software version installed in the lens controller 240, and firmware updates.

The lens information also includes information related to whether or not the lens unit 200 comprises the OIS lens 220 or another such means for correcting image blur, and, if a means for correcting image blur is installed, information related to the detection performance thereof, such as the model number and sensitivity, information related to the correction performance, such as the maximum correctable angle (lens-side correction performance information), the software version used for image blur correction, and so forth.

Furthermore, the lens information includes information related to the power consumption necessary for driving the blur corrector (lens-side power consumption information), and information related to the drive type of the blur corrector (lens-side drive method information).

The flash memory 242 is able to store information sent from the camera controller 140.

The lens mount 71 has the electrical contacts 253. The body mount 41 and the lens mount 71 can be electrically connected by the electrical contacts 153 of the body mount 41 and the electrical contacts 253 of the lens mount 71. Also, the electrical contacts 153 of the body mount 41 and the electrical contacts 253 of the lens mount 71 allow power, data, and/or control signals to be sent and received.

As shown in FIG. 1, a second operation portion, namely, the operation member 213 is provided to the lens unit 200. More specifically, when the lens unit 200 is viewed from the subject side, at least part of the operation member 213 is provided on the right side face on the outer peripheral part of the lens unit 200. Even more specifically, when the lens unit 200 is viewed from the subject side, the operation member 213 is provided on the right side face on the outer peripheral part of the lens unit 200. Also, the operation member 213 is a sliding type of operation member that can be slid on the outer peripheral part of the lens unit 200.

2: Zooming 2.1: Attachment and Removal of Interchangeable Lens to and from Camera Body A lens locking pin 41b is provided to the body mount 41 of the camera body 100 so as to be capable of protruding and being pushed in. When the lens unit 200 has been mounted to the body mount 41, the lens locking pin 41b is fitted into a locking pin fitting hole 71b of the lens mount 71. Furthermore, the lens locking pin 41b is biased in the protruding direction by a lens locking pin biasing spring (not shown) in order to maintain the protruding state.

A lens attachment and removal member 41c is provided so as to be capable of protruding and being pushed in. The lens attachment and removal member 41c is mechanically linked to the lens locking pin 41b. When the lens unit 200 is removed, the user pushes the lens attachment and removal member 41c into the interior of the camera body 100. When this happens, the lens attachment and removal member 41c is pushed in against the biasing force of a lens attachment and removal member biasing spring (not shown), and the lens locking pin 41b is also pushed in. As a result, the lens locking pin 41b is disengaged from the locking pin fitting hole 71b of the lens mount 71, and the lens unit 200 is able to rotate with respect to the camera body 100. The user can then remove the lens unit 200 from the camera body 100 at the position where the rotational position relation between the body mount 41 and the lens mount 71 is in a first state. The lens locking pin 41b returns to its protruding state at the position where the rotational position relation between the body mount 41 and the lens mount 71 is in this first state.

A lens attachment and removal detection switch 41e can detect that the lens attachment and removal member 41c has been operated and that the lens locking pin 41b has been pushed in. More specifically, the lens attachment and removal detection switch 41e is operated when the lens attachment and removal member 41c is pushed in or when the lens locking pin 41b is pushed in. When the lens unit 200 is removed from the camera body 100, the lens locking pin 41b returns to its protruding state, and the operation of the lens attachment and removal detection switch 41e is released.

When the lens unit 200 is to be mounted, the user turns the lens unit 200 from the position at which the rotational position relation between the body mount 41 and the lens mount 71 is in the first state to the position of the second state. The lens locking pin 41b is protruding in the first state, but when the lens unit 200 is turned from the first state to the second state, this lens locking pin 41b hits the lens mount 71 and is pushed in. In the second state, the lens locking pin 41b fits into the locking pin fitting hole 71b of the lens mount 71 and enters its protruding state. When the lens unit 200 is to be mounted, the lens attachment and removal detection switch 41e is operated in conjunction with this operation of the lens locking pin 41b.

As discussed above, the lens attachment and removal detection switch 41e can detect attachment and removal of the lens unit 200.

2.2: Zooming and Recognition of Lens Unit by Camera Body

When the lens attachment and removal detection switch 41e is operated and attachment or removal of a lens is detected, the camera controller 140 begins exchanging data and/or control signals with the lens controller 240. At this point, the camera controller 140 identifies whether or not the mounted lens unit 200 is compatible with electrical zooming on the basis of identifying information related to the model (lens identification information).

If the lens unit 200 is compatible with electrical zooming, the camera controller 140 permits zooming with the operation member 133 of the camera body 100. Furthermore, the camera controller 140 directs the lens controller 240 to allow manual focusing with the operation member 213 of the lens unit 200.

An example was given here in which zooming was performed with the camera body 100 and manual focusing was performed with the lens unit 200 in a case in which the lens unit 200 was compatible with electrical zooming, but the configuration may be such that this selection can be changed at the user's discretion. For instance, all combinations can be selected, such as performing manual focusing with the camera body 100 and performing zooming with the lens unit 200.

When the operation member 133 of the camera body 100 is operated in this state, an operation signal corresponding to this operation is recognized by the camera controller 140. When this happens, the camera controller 140 issues a command to execute zooming to the lens controller 240. When the lens controller 240 receives this command to execute zooming, the lens controller 240 controls the zooming of the lens unit 200. Consequently, the zoom lens 210 is driven and the magnification of the subject image (the focal distance of the optical system) changes as discussed above.

Meanwhile, if the operation member 213 of the lens unit 200 is operated, an operation signal corresponding to this operation is recognized by the lens controller 240. When this happens, the lens controller 240 controls the focusing of the lens unit 200 on the basis of this operation signal. Consequently, the focus lens 230 is driven and the focal state of the subject image changes as discussed above.

Thus, when the operation member 133 of the camera body 100 is operated, zooming is executed by the lens unit 200, and when the operation member 213 of the lens unit 200 is operated, focusing is executed by the lens unit 200.

Here, if the operation member 133 of the camera body 100 is operated, the camera controller 140 and the lens controller 240 both contribute to the control of the lens unit 200. Also, if the operation member 213 of the lens unit 200 is operated, just the lens controller 240 contributes to the control of the lens unit 200.

On the other hand, if the lens unit 200 is not compatible with electrical zooming, such as when the lens unit 200 is made up of a manual zoom lens, the camera controller 140 prohibits zooming with the operation member 133 of the camera body 100. Specifically, even if the operation member 133 of the camera body 100 is operated, no zoom command will be issued from the camera controller 140 to the lens controller 240. In this case, the camera controller 140 assigns functions other than zooming to the operation member 133 of the camera body 100. Specifically, the camera controller 140 assigns functions capable of executing control of the camera body 100 and/or control of the lens unit 200 to the operation member 133 of the camera body 100.

If the functions assigned to the operation member 133 are with respect to the camera body 100, then when the operation member 133 of the camera body 100 is operated, as discussed above, the camera controller 140 contributes to control and the functions of the camera body 100 are executed. On the other hand, if the functions assigned to the operation member 133 are with respect to the lens unit 200, then as discussed above, the camera controller 140 and the lens controller 240 both contribute to control and the functions of the lens unit 200 are executed.

2.3: When Camera Body has No Operation Member 133

We will now describe zooming when a lens unit 200 that is compatible with electrical zooming has been mounted on the camera body 100, and when the body mount 41 is interchangeable with the lens mount 71, and the operation member 133 is not installed on the camera body 100.

The above-mentioned camera body 100 may be, for example, a camera body 100 which was released before when electrical zooming-compatible lens units were available on the market. In this case, the camera body 100 does not include any command for zooming. Specifically, the camera controller 140 cannot send the lens controller 240 a command to execute zooming. Therefore, zooming is executed with the operation member 213 of the lens unit 200. In this case, manual focusing cannot be executed.

With the above camera body, meanwhile, it is possible to assign a zooming function to an operation member 134 provided to the camera body 100 shown in FIGS. 1 and 2, by updating the control firmware of the camera controller 140. In this case, just as in section 2.2, the camera controller 140 can send the lens controller 240 a command to allow manual focusing with the operation member 213 of the lens unit 200. Specifically, manual focusing can be assigned to the operation member 213 of the lens unit 200. In this case, when the operation member 134 of the camera body 100 is operated, zooming is executed by the lens unit 200, and when the operation member 213 of the lens unit 200 is operated, focusing is executed by the lens unit 200.

The configuration may also be such that this selection can be changed at the user's discretion. For instance, all combinations can be selected, such as assigning manual focusing to the operation member 134 of the camera body 100, and performing zooming with the lens unit 200.

Features of Embodiments

Characteristic portions of the above embodiments are listed below. The technologies included in the above embodiments are not limited to or by the following.

(1) A camera system comprising the camera body 100, wherein the camera body 100 has a mount that allows the lens unit 200 to be attached and removed. The lens unit 200 is capable of electrical optical zoom with at least one operation portion. Of the various operation members of the camera body, optical zooming can be performed with the operation member 133 to which zooming has been assigned. Therefore, the user can perform optical zooming on the camera body 100 side, just as with a compact camera, without operating an operation member on the lens unit 200 side. This makes it possible to provide a camera system that is extremely convenient to use, even for a novice in handling an interchangeable lens type of camera.

(2) With the camera system discussed in (1), optical zooming can also be performed with an operation portion of the lens unit 200, such as the operation member 213.

(3) With the camera system discussed in (1), if optical zooming can be performed with an operation portion of the camera body 100, such as the operation member 133, then the focus can be adjusted manually even with a lens unit 200 having only one operation portion, by making manual focus drive possible with an operation portion of the lens unit 200, such as the operation member 213.

(4) With the camera system discussed in (1) to (3), if manual focusing is assigned to the operation member 133 of the camera body 100, optical zooming can be performed with the operation member 213 of the lens unit 200. This makes it possible for the user to freely change what is being operated, making the camera more convenient to the user.

(5) A camera system comprising a camera body, wherein the camera body 100 has a mount that allows the attachment and removal of an electrical optical zoom lens unit having at least one operation portion. With the camera body 100, when manual focus drive of the lens unit 200 is performed with one of the various operation members of the camera body 100, optical zooming can be performed electrically with the operation member 213 of the lens unit 200. Thus, what is done by the operation member 213 of the lens unit 200 can be unconditionally decided by arbitrarily deciding what is to be done by the operation member 133 of the camera body 100.

(6) The camera system discussed in (1) to (5), wherein when a lens unit 200 is mounted that is incapable of electrical zooming, the function of controlling camera functions can be assigned to the operation portion assigned for zooming. Therefore, an operation portion on the camera body 100 can be use conveniently even when a lens unit other than one with electrical zooming is mounted.

(7) The zooming operation member 133 provided to the camera body 100 and discussed in (1) to (6) is disposed rotatably around a release button, and can be operated with the index finger of the user. Therefore, even a novice in handling an interchangeable lens type of camera can perform optical zooming on the camera body 100 side just as with a compact camera. Accordingly, it is possible to provide a camera system that is extremely convenient to use.

(8) The zooming operation member 133 provided to the camera body 100 and discussed in (1) to (6) is disposed on the rear face of the camera body 100, at a position that can be reached by the thumb of the user.

(9) The camera system discussed in (1) to (8), wherein the operation portion of the camera body 100 assigned for zooming may allow a reproduced image to be enlarged or reduced in the reproduction of a captured image.

(10) The camera system discussed in (1) to (8), wherein the operation portion of the camera body 100 assigned for zooming may allow exposure correction.

(11) The camera system discussed in (1) to (8), wherein the operation portion of the camera body 100 assigned for zooming may allow stop-down.

(12) The camera system discussed in (1) to (8), wherein the operation portion of the camera body 100 assigned for zooming may allow a change in ISO sensitivity.

(13) The camera system discussed in (1) to (8), wherein the operation portion of the camera body 100 assigned for zooming may allow a change in white balance.

(14) The camera system discussed in (1) to (8), wherein the operation portion of the camera body 100 assigned for zooming may allow shutter speed adjustment.

(15) The camera system discussed in (1) to (8), wherein the operation portion of the camera body 100 assigned for zooming may allow a change in image resolution.

(16) The camera system discussed in (1) to (8), wherein the operation portion of the camera body 100 assigned for zooming may allow a change in the number of pixels.

(17) The camera system discussed in (1) to (8), wherein the operation portion of the camera body 100 assigned for zooming may allow a change in the dark correction level.

(18) The camera system discussed in (1) to (8), wherein the operation portion of the camera body 100 assigned for zooming may allow a change in drive mode (single capture, sequential capture, self-timer, etc.).

(19) The camera system discussed in (1) to (8), wherein the operation portion of the camera body 100 assigned for zooming may allow a change in the AF target.

(20) The camera system discussed in (1) to (8), wherein the operation portion of the camera body 100 assigned for zooming may allow a change in the AF mode.

(21) The camera system discussed in (1) to (8), wherein the operation portion of the camera body 100 assigned for zooming may allow a change in the AE mode.

(22) The camera system discussed in (1) to (8), wherein the operation portion of the camera body 100 assigned for zooming may allow a change in the AF drive mode (AFS, AFC, etc.)

(23) The camera system discussed in (1) to (8), wherein the operation portion of the camera body 100 assigned for zooming may allow scrolling through reproduced images.

(24) The camera system discussed in (1) to (8), wherein the operation portion of the camera body 100 assigned for zooming may allow scene selection in scene select mode.

(25) The camera system discussed in (1) to (8), wherein the operation portion of the camera body 100 assigned for zooming may allow electrical zooming to be performed continuously from the optical zoom end.

(26) The camera system discussed in (1) to (8), wherein the operation portion of the camera body 100 assigned for zooming may be changed to various filters such as the film mode.

Other Embodiments (A) In the above embodiments, even though the lens unit 200 had a plurality of operation members 213, no particular mention was made of the functions assigned to the various operation members 213. This category will be discussed now. For example, if the lens unit 200 has two operation members 213, one of the operation members 213 may function as a zooming operation portion, and the other operation member 213 may function as a focusing operation portion. If the lens unit 200 has three or more operation members 213, these operation members 213 may correspond respectively to a zooming operation portion, a focusing operation portion, a shake correction operation portion, a stop operation portion, etc.

(B) In the above embodiments, an example was given in which two operation members 213 were disposed aligned in the circumferential direction around the outer peripheral part of the lens unit 200, but the two operation members 213 may instead be disposed aligned in the optical axis direction around the outer peripheral part of the lens unit 200.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of camera system, camera body, and lens unit. Accordingly, these terms, as utilized to describe the present technology should be interpreted relative to camera system, camera body, and lens unit.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

INDUSTRIAL APPLICABILITY

The present technology can be widely applied to a camera system, a camera body, and a lens unit. More specifically, it can be applied to a digital still camera, a movie camera, or the like.

What is claimed is:
1. A camera system comprising:
 a camera body including:
  an image sensor; and
  a body mount configured to send a command to an interchangeable lens mounted thereto;
 an interchangeable lens configured to be mounted to the camera body, the interchangeable lens including:
  an operation portion configured to accept an operation by a user;
  a zoom lens configured to change the magnification of an optical image of a subject;

a zoom motor configured to drive the zoom lens in a direction parallel to the optical axis;

a lens mount configured to receive a zoom control command from the camera body for controlling the zoom motor;

a focus lens configured to change the focal state of the optical image of a subject;

a focus motor configured to drive the focus lens in a direction parallel to the optical axis; and a controller configured to:

control the zoom motor when the operation portion accepts an operation by a user and the camera body does not have a function to send the zoom control command; and control the focus motor when the operation portion accepts an operation by a user and the camera body has a function to send the zoom control command.

2. The camera system according to claim 1, wherein
the camera body has the function to send the zoom control command, and
the camera body includes a camera body operation portion which is a zoom operation portion for changing the magnification of an optical image.

3. The camera system according to claim 2, wherein
the interchangeable lens is configured to adjust the focus of an optical image electrically, and
the operation portion is a focus operation portion for adjusting the focus of an optical image.

4. The camera system according to claim 2, the camera body further comprising:
a display unit, wherein
the zoom operation portion is disposed on a right side of an upper face of the camera body if the camera body is viewed from the display unit side.

5. The camera system according to claim 2, the camera body further comprising:
a display unit, wherein
the zoom operation portion is disposed on a right side of a rear face of the camera body if the camera body is viewed from the display unit side.

6. The camera system according to claim 1, wherein
the camera body does not have the function to send the zoom control command, and
the operation portion is a zoom operation portion for changing the magnification of an optical image.

7. An interchangeable lens mountable to a camera body, the interchangeable lens comprising:

an operation portion configured to accept an operation by a user;

a zoom lens configured to change the magnification of an optical image of a subject;

a zoom motor configured to drive the zoom lens in a direction parallel to the optical axis;

a lens mount configured to receive a zoom control command from the camera body for controlling the zoom motor;

a focus lens configured to change the focal state of the optical image of a subject;

a focus motor configured to drive the focus lens in a direction parallel to the optical axis; and a controller configured to:

control the zoom motor when the operation portion accepts an operation by a user and the camera body does not have a function to send the zoom control command; and control the focus motor when the operation portion accepts an operation by a user and the camera body has a function to send the zoom control command.

8. The interchangeable lens according to claim 7, wherein the operation portion is a sliding type of operation portion that is configured to slide on an outer peripheral part of the interchangeable lens.

9. The interchangeable lens according to claim 7, wherein at least a part of the operation portion is disposed on a right side face if the interchangeable lens is viewed from a subject side.

* * * * *